No. 842,233. PATENTED JAN. 29, 1907.
J. A. McLANE.
ART OF MAKING GLASS ARTICLES.
APPLICATION FILED APR. 16, 1906.
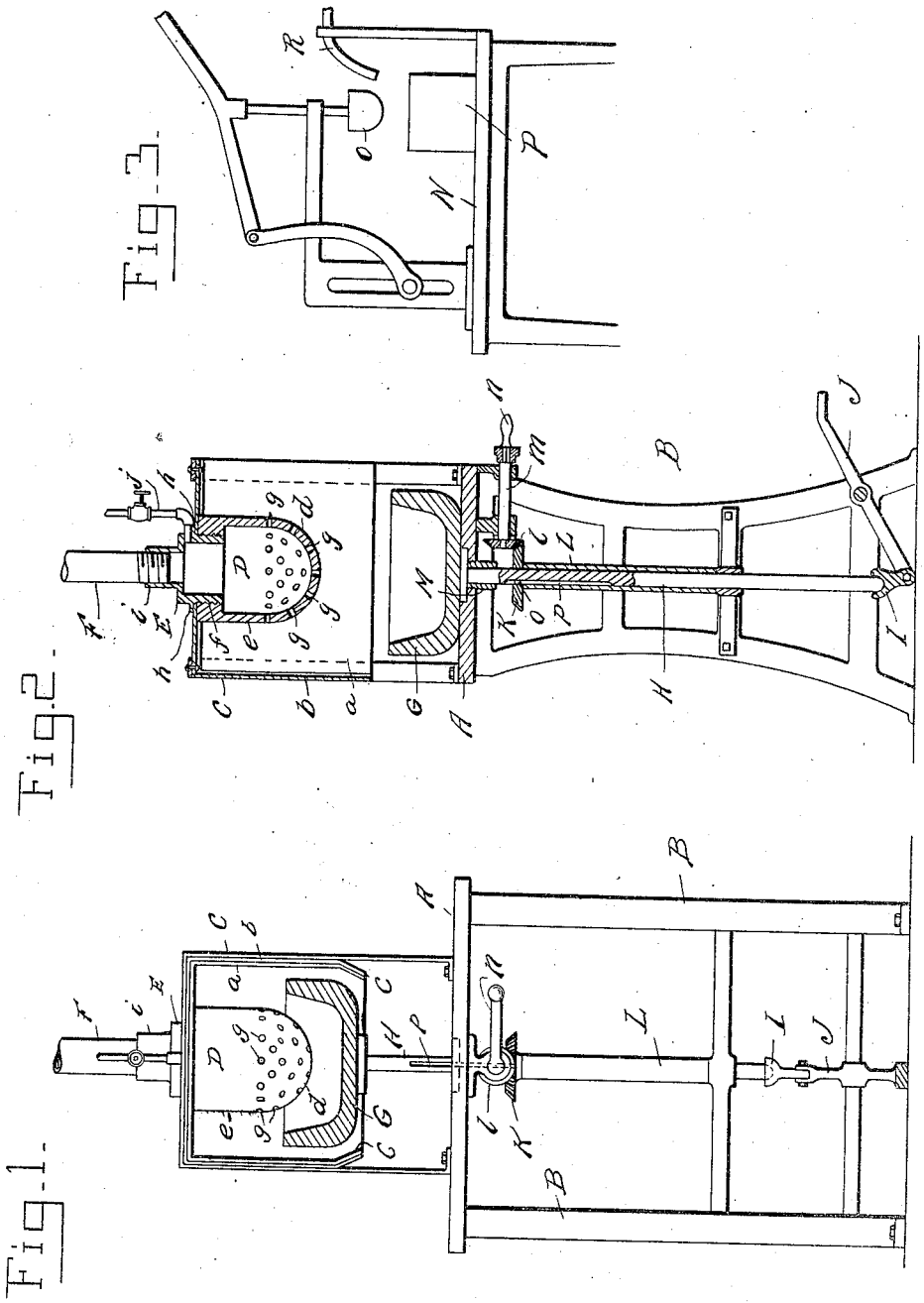
Witnesses
G. R. Thomas
J H Gallaher
Inventor
Joseph A. McLane
By W. A. Redmond
Attorney

UNITED STATES PATENT OFFICE.

JOSEPH A. McLANE, OF GRAFTON, WEST VIRGINIA, ASSIGNOR TO JOHN B. HART, OF HARRISON COUNTY, WEST VIRGINIA, JOSEPH FUCCY, OF LEWIS COUNTY, WEST VIRGINIA, AND CHARLES R. DURBIN AND GEORGE H. A. KUNST, OF TAYLOR COUNTY, WEST VIRGINIA.

ART OF MAKING GLASS ARTICLES.

No. 842,233.   Specification of Letters Patent.   Patented Jan. 29, 1907.

Application filed April 16, 1906. Serial No. 311,980.

*To all whom it may concern:*

Be it known that I, JOSEPH A. MCLANE, a citizen of the United States, residing at Grafton, in the county of Taylor and State of West Virginia, have invented certain new and useful Improvements in the Art of Making Glass Articles; and I do declare the following to be a full, clear, and exact description of the invention, such as will enable others skilled in the art to which it appertains to make and use the same.

This invention relates to processes for making glass articles; and it has for its object to provide a process for expeditiously and inexpensively removing mold-marks and other imperfections from such articles and imparting a polish thereto. It has been proposed to accomplish this object in so far as the interiors of bowls and similar articles are concerned by subjecting their interior surfaces to the action of a flame while the article is held in the mold in which it has been formed, the mold containing the article being at once moved into position under a burner upon the withdrawal of the plunger therefrom and while the article is in a plastic state or condition. The main objection to this method of smoothing the interior of such articles lies in the fact that the application of a melting heat to an article of glass in a plastic condition is liable to cause the glass to sag downwardly and to unduly thicken at the bottom portion thereof, while it also has a tendency to gravitate toward the center or deeper portion of the bowl and form a ridge or ridges which greatly impair the commercial value of the finished product. It has also been proposed to remove mold-marks and defects from glass articles by applying a polishing heat to one surface thereof while a cooling jet or jets of air is projected against its opposite surface. In carrying out this method the article is to be placed upon a disk which is rotated under a burner while the air-jets play upon the exterior surface of the article; but no mechanical support is provided to maintain the shape of the article and to prevent distortion thereof while under treatment, the theory being that the air jets or blasts will suffice to counteract the effect of the heat and maintain the shape of the article. The disadvantage of this process seems apparent when it is considered that the unequal expansion and contraction of the glass due to the simultaneous application of heat to the inner side of the wall of the article and cold air to the outer or opposite side of the wall necessarily causes frequent breakage of the articles under treatment.

I have discovered by actual experiments that the surface of the article may be cooled or chilled while in the mold so as to impart sufficient stability to the glass to enable it to maintain its shape while under the action of the polishing or smoothing flame and that this hardening of the glass does not in any manner militate against the perfect and expeditious removal of the mold-marks or other defects or imperfections which occur in the surface of the glass article.

I will now describe an apparatus or machine by which my process may be carried out; but I do not desire to be understood as restricting the same to the apparatus herein described, as I may use any desired or preferred construction or arrangement of mechanical parts to accomplish my purpose without departing from the spirit or scope of my invention.

In the accompanying drawings, Figure 1 is a front elevation of an apparatus adapted to carry out my invention, the holder for the glass article being shown in vertical section. Fig. 2 is a side elevation, partly in vertical section. Fig. 3 is a perspective view of a press.

Similar letters refer to similar parts throughout the several views.

Referring to the drawings, A represents a table suitably supported by legs B, on which is secured the burner-hood C. The hood is preferably rectangular in shape, with a closed top and open at one side, and is lined with sheet-asbestos $a$, superposed on sheet metal $b$; but any other suitable lining may be employed. The lower edge of the lining is bent inwardly, as at $c$, in order to assist in confining the heat within the hood. The burner proper, D, is formed with a round bottom $d$ and cylindrical body portion $e$, and an internally-threaded collar $f$ is secured in its mouth or open end, while the bottom is formed with numerous perforations $g$, arranged in staggered form and extending in radial lines from a common center in order to direct the gases issuing therefrom in independent jets, the intensity of the heat of which is greatly increased by reason of the addition of air under pressure, as will be described. The burner is supported in position at the upper part of the hood by screwing onto the threaded exterior of the cylindrical mixing-chamber E, as clearly shown in Fig. 2. The mixing-chamber E opens directly into the burner D and is supported in an opening in the top of the hood by means of a lateral flange $h$, cast or otherwise secured to the cylindrical chamber. At the top of the chamber E a tubular extension $i$ is formed, which is interiorly screw-threaded to receive the threaded end of a pipe F, through which air is admitted to the mixing-chamber under pressure from an air-reservoir or air-pump. (Not shown.) At one side of the tubular extension $i$ a pipe $j$ leads from any suitable source of gas-supply and discharges into the mixing-chamber, where it commingles with the air and is driven through the burner-openings in jets, as described above.

A holder G, adapted in general outline to the shape of the article being treated, is supported within the hood on a shaft H, said shaft being stepped in a socket I, pivotally supported in the forked end of a treadle-lever J, fulcrumed on the frame of the table. The shaft H extends through bearings in the framework and carries a beveled gear $k$, which meshes with a beveled pinion $l$, secured on the end of a horizontal shaft $m$, suitably journaled from the frame and operated by a crank-handle $n$. The beveled gear $k$ is slidingly secured to the shaft H by a key $o$ thereon engaging a longitudinal groove $p$ in the shaft, so that the shaft may be raised and lowered without disturbing the position of the said gear $k$, the latter being supported by a tube L, which surrounds the shaft and rests on one of the cross-bars of the frame. A bushing M for the shaft H screws into the table of the machine.

N represents a press having a plunger O and a mold P, all of which may be of the usual or any preferred form.

R represents a flexible tube or pipe, which is supported in any desired manner from the frame of the press and leads from a reservoir of compressed air, (not shown,) whereby the operator may direct a current of air under pressure in and onto the article immediately after the plunger is withdrawn from the mold, and thereby chill the surface of the article exposed to the air-blast.

In carrying out my process the molten glass is placed in the mold in the usual manner and the plunger brought down thereon to press the mass into the shape of the article being molded. The plunger is then raised to withdraw it from the mold, and the end of the tube or pipe R is directed so as to discharge a blast of compressed air into the article while it yet remains in the mold. The article is then transferred from the mold to the holder and the latter raised so as to cause the article (if a bowl or other hollow article) to partly inclose the lower part or bottom of the burner, but leaving a space sufficient for combustion therebetween. The air and gas is then turned on and ignited by any suitable means and the shaft carrying the holder revolved so as to bring all the uncovered surface of the article under the action of the flames, which quickly superficially melts the surface and eliminates all the mold-marks and other imperfections and defects therefrom. The article is then lowered away from the burner and the usual process of leer-tempering and cooling is proceeded with to complete article for commercial purposes.

Among the advantages of this process is that the color of the glass is not reduced at any time during the process. In other words, the glass maintains the color as fixed while in the melting-pot through all the steps of the process, this desirable result obtaining by reason of the fact that the surface of the article is merely superficially melted, because its exposure to the flame is of but short duration, and although the heat of the flame is intense it does not penetrate into the substance of the article.

Having thus described my invention, what I claim as new, and desire to secure by Letters Patent, is—

1. The herein-described improvement in the art of making glass articles which comprises shaping the molten glass to the desired form, chilling the plain surface thereof, and then revolving the article with its plain surface exposed to a melting-flame to produce a smooth surface.

2. The herein-described process of polishing or smoothing the plain surfaces of pressed glass articles which comprises molding molten glass to the desired shape, chilling the plain surface thereof to cause it to retain its shape, and then exposing its plain surface to the action of a melting heat.

3. The herein-described process of making glass articles which comprises molding the molten glass to the desired shape, then cooling the article, then covering the design or pattern on the article, and then subjecting its exposed surface to the action of a heating-flame.

4. The herein-described process of making glass articles which comprises molding the molten glass into the desired shape, then placing the same in a holder, then causing the former or holder to approach a burner, and then directing the heating medium in jets into the interior of the article.

5. The herein-described process of making glass articles which comprises molding the molten glass into the desired shape, then supporting it by a former or holder, then causing the holder to approach a burner, then revolving the holder, and then directing the heating medium in jets onto the article.

6. The herein-described process of making glass articles which comprises molding or pressing the molten glass into the desired shape, then removing the same from the mold, and placing it in a holder, then causing the holder to approach a burner, then directing the heating medium onto the article, and then causing the former or holder to revolve.

7. The herein-described process of making glass articles which comprises the shaping of the molten glass to the form desired, then cooling the article, and then subjecting the surface of the cooled article to a reheating agent while the same is being revolved.

8. The herein-described process of making glass articles which comprises the shaping of the molten glass to the desired form, then cooling the same, then applying heat to that surface of the article it is desired to reheat while the article is being revolved.

9. The herein-described process of making glass articles which comprises shaping the molten glass into the article desired and cooling the same, then subjecting the cooled article while held in a holder to the action of heated gases to melt out imperfections in the surface of the same.

10. The herein-described process of glazing or polishing glass articles which comprises supporting the article in a holder, then inserting the holder into a closed chamber and subjecting the exposed surface of the article to the direct action of heated gases.

In testimony whereof I affix my signature in presence of two witnesses.

JOSEPH A. McLANE.

Witnesses:
FRANCIS S. MAGUIRE,
G. H. A. KUNST.